(12) United States Patent
Kuehl et al.

(10) Patent No.: US 8,457,034 B2
(45) Date of Patent: Jun. 4, 2013

(54) AIRBORNE COMMUNICATION NETWORK

(75) Inventors: Charles S. Kuehl, Fishers, IN (US);
William T. Stiffler, Greenwood, IN (US)

(73) Assignee: Raytheon Company, Waltham, MA (US)

( * ) Notice: Subject to any disclaimer, the term of this patent is extended or adjusted under 35 U.S.C. 154(b) by 650 days.

(21) Appl. No.: 12/481,983

(22) Filed: Jun. 10, 2009

(65) Prior Publication Data

US 2009/0310531 A1 Dec. 17, 2009

Related U.S. Application Data

(60) Provisional application No. 61/073,277, filed on Jun. 17, 2008.

(51) Int. Cl.
*H04B 7/185* (2006.01)

(52) U.S. Cl.
USPC ......................................... 370/316

(58) Field of Classification Search
None
See application file for complete search history.

(56) References Cited

U.S. PATENT DOCUMENTS

| | | | |
|---|---|---|---|
| 6,233,600 B1 | 5/2001 | Salas et al. | |
| 6,604,104 B1 | 8/2003 | Smith | |
| 6,643,652 B2 | 11/2003 | Helgeson et al. | |
| 6,671,737 B1 | 12/2003 | Snowdon et al. | |
| 7,127,613 B2 | 10/2006 | Pabla et al. | |
| 7,200,657 B2 | 4/2007 | Adams et al. | |
| 7,219,107 B2 | 5/2007 | Beringer | |
| 7,370,075 B2 | 5/2008 | Farquharson et al. | |
| 7,398,327 B2 | 7/2008 | Lee | |
| 7,434,220 B2 | 10/2008 | Husain et al. | |
| 7,454,399 B2 | 11/2008 | Matichuk | |
| 7,519,014 B2 * | 4/2009 | Allen et al. | 370/310 |
| 2003/0061404 A1 | 3/2003 | Atwal et al. | |
| 2003/0217363 A1 * | 11/2003 | Brady et al. | 725/76 |
| 2004/0031037 A1 | 2/2004 | Ikoma et al. | |
| 2004/0142658 A1 | 7/2004 | McKenna et al. | |

(Continued)

FOREIGN PATENT DOCUMENTS

| | | |
|---|---|---|
| GB | 2 433 006 | 11/2006 |
| GB | 2433006 A | 6/2007 |
| WO | WO 2009/155194 A1 | 12/2009 |

OTHER PUBLICATIONS

PCT Notification of Transmittal of the International Search Report and the Written Opinion of the International Searching Authority, or the Declaration, International Application No. PCT/US2009/046991; Filing Date Jun. 11, 2009, 10 pages, Nov. 20, 2009.

(Continued)

*Primary Examiner* — Chi Pham
*Assistant Examiner* — Kouroush Mohebbi
(74) *Attorney, Agent, or Firm* — Daly, Crowley, Mofford & Durkee, LLP

(57) ABSTRACT

According to one embodiment, an airborne communication network includes a node configured on an aircraft having one or more communication devices that communicate using a native communication protocol. The node includes an information conversion system that receives information formatted according to the native communication protocol from the communication devices, encapsulates the information in packets according to a common communication protocol, and stores the packets in a mass storage device. The packets may then be published for receipt by other nodes configured on other aircraft. The information conversion system may also subscribe to packets stored in the nodes of other aircraft.

18 Claims, 2 Drawing Sheets

U.S. PATENT DOCUMENTS

2005/0090201 A1* 4/2005 Lengies et al. ............... 455/41.2
2005/0190708 A1* 9/2005 Farr et al. ...................... 370/294
2005/0271083 A1 12/2005 Spinoso
2007/0100981 A1 5/2007 Adamczyk et al.
2008/0037453 A1 2/2008 Bolt et al.
2008/0301430 A1 12/2008 Bradley et al.

OTHER PUBLICATIONS

Official Action; European Patent Office; Application No. 09 767 504.5-1246; 5 pages, Jun. 10, 2011.

Notification of Transmittal of the International Search Report and the Written Opinion of the International Searching Authority, or the Declaration, PCT/US2009/046991, Date of mailing: Nov. 20, 2009, 4 pages.

Written Opinion of the International Searching Authority, PCT/US2009/046991, Date of mailing: Nov. 20, 2009, 4 pages.

International Preliminary Report on Patentability dated Dec. 18, 2012, PCT/US2009/046991, 1 page.

Office Action dated Jan. 25, 2011, EP Application No. 09767504.5, filed Jun. 10, 2009, 2 pages.

Response to Office Action dated Jan. 25, 2011, filed Feb. 15, 2011, EP Application No. 09767504,5, 14 pages.

Office Action dated Jun. 10, 2011, EP Application No. 09767504.5, filed Jun. 10, 2009, 5 pages.

Response to Office Action dated Jun. 10, 2011, filed Dec. 8, 2011 for EP Application No. 09767504.5, 19 pages.

* cited by examiner

US 8,457,034 B2

AIRBORNE COMMUNICATION NETWORK

RELATED APPLICATIONS

This application claims priority to U.S. Provisional Patent Application Ser. No. 61/073,277, entitled "AIRBORNE COMMUNICATION NETWORK," which was filed on Jun. 17, 2008.

TECHNICAL FIELD OF THE DISCLOSURE

This disclosure generally relates to communication networks, and more particularly to an airborne communication network for communication among a number of aircraft.

BACKGROUND OF THE DISCLOSURE

Aircraft systems use sensors to monitor their conditions and conditions external to the aircraft. For example, military aircraft may use sensors that monitor battle conditions. A control tower or other central control station may coordinate multiple aircraft by monitoring the location of each aircraft and providing flight instructions and communication for the aircraft.

SUMMARY OF THE DISCLOSURE

According to one embodiment, an airborne communication network includes a node configured on an aircraft having one or more communication devices that communicate using a native communication protocol. The node includes an information conversion system that receives information formatted according to the native communication protocol from the communication devices, encapsulates the information in packets according to a common communication protocol, and stores the packets in a mass storage device. The packets may then be published for receipt by other nodes configured on other aircraft. The information conversion system may also subscribe to packets stored in the nodes of other aircraft.

Some embodiments of the disclosure may provide numerous technical advantages. For example, the airborne communication network includes nodes that autonomously exchange knowledge among multiple airborne systems. Each node incorporates a digital data exchange infrastructure that provides machine to machine (M2M) communication for automatic generation of information. The nodes, along with multiple mass storage devices, may autonomously exchange information for time critical operations, such as time critical targeting maneuvers.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Aircraft often use sensors for monitoring its operation and other conditions around the aircraft. Information communication devices coupled to these sensors typically communicate information to a central control station using a "stove pipe" architecture. "Stove pipe" architectures generally refer to an operating mode of communication networks in which their nodes readily share information with only one or several other constituent nodes. Information sharing among the numerous aircraft, however, may be difficult to achieve in a timely manner.

Figure 1:
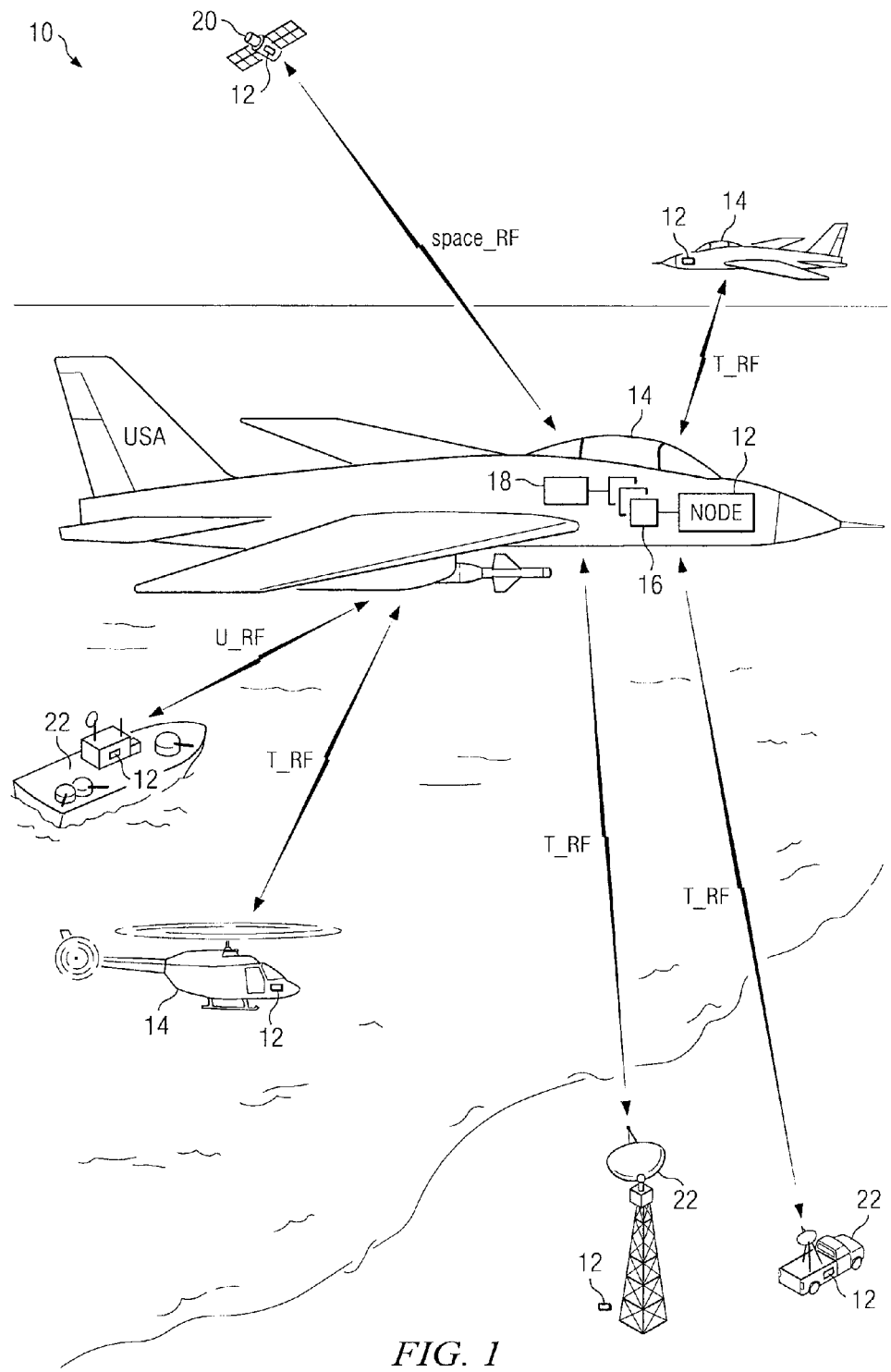
FIG. 1 is an illustration showing one embodiment of an airborne communication network according to the teachings of the present disclosure.

FIG. 1 shows one embodiment of an airborne communication network 10 according to the teachings of the present disclosure. Airborne communication network 10 includes a number of nodes 12 that are each configured in an aircraft 14. Each aircraft 14 may have one or more communication devices 16 that generate information from onboard sensors 18, user input to these communication devices 16, or other onboard or remote sources. Nodes 12 may also be configured in other devices, such as satellites 20 or ground-based stations 22, that communicate with aircraft 14. In certain embodiments, each node 12 encapsulates information generated by communication devices 16 in a common communication protocol, stores the information, and publishes the information for use by other aircraft 14.

Aircraft 14 may coordinate with each other for any suitable reason. For example, different types of aircraft 14 may coordinate with each other during a military operation. In certain embodiments, aircraft 14 may communicate information using a native protocol that differs from those used by other aircraft 14. For example, aircraft 14 may communicate using a terrestrial radio frequency (T_RF) protocol. Satellites 16 may use a space radio frequency (space_RF) protocol. Ground based stations 18 may use a terrestrial radio frequency (T_RF) protocol or a unidirectional radio frequency (U_RF) protocol. Each node 12 encapsulates information and its associated protocol into a form that may be readable by other aircraft 14 or devices, such as satellites 20 or ground-based stations 22.

Node 12 encapsulates information over any suitable protocol that is readable by other nodes 12. In one embodiment, node 12 encapsulates information into one or message packets having an extensible markup language (XML) protocol and transports these message packets among nodes 12 using an Internet Protocol version 6 (IPv6) network. In another embodiment, node 12 encapsulates streaming information, such as analog voice data, digital voice data, or video data, into multimedia content packets that may be transported over the IPv6 network. Examples of suitable multimedia content packet formats suitable for this purpose include a voice over Internet Protocol (VOIP), a motion picture experts group (MPEG) protocol, or a digital video broadcasting (DVB) protocol.

Nodes 12 of airborne communication network 10 may be implemented on any suitable type of aircraft. In the particular embodiment shown, aircraft 14 are military aircraft 14. Other examples of aircraft 14 include commercial aircraft that may share information among one another, such as weather information.

In one embodiment, the airborne communication network 10 may form a portion of the Global Information Grid (GIG).

To promote information sharing among its member organizations, the United States Department of Defense (DoD) has developed the Global Information Grid to handle information. The Global Information Grid is associated with a set of information handling capabilities, associated processes, and personnel for managing information among its various military agencies. Nodes 12 may receive information from the Global Information Grid, encapsulate the information in the common communication protocol, and publish the encapsulated packets for other nodes 12 configured in the airborne communication network 10.

Figure 2:
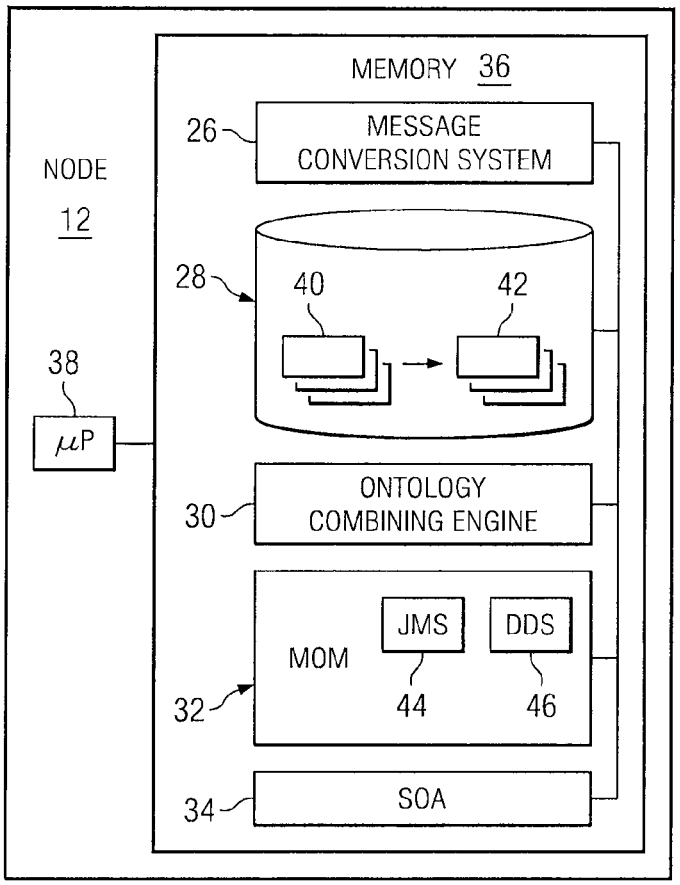
FIG. 2 is a diagram showing one embodiment of a node that may be used with the airborne communication network of FIG. 1.

FIG. 2 is a block diagram showing one embodiment of a node 12 that may be used with the airborne communication network 10 of FIG. 1. Node 12 includes an information conversion system 26, a mass storage device 28, an ontology combining engine 30, a message oriented middleware (MOM) infrastructure 32, and a service oriented architecture (SOA) infrastructure 34 that may be stored in a memory 36 and executed by a processor 38 of node 12.

Node 12 may comprise any suitable type of computing system that executes instructions stored in its memory 36. For example, node 12 may include a personal computer, laptop computer, or mainframe computer capable of executing instructions necessary to implement execute information conversion system 26, ontology combining engine 30, message oriented middleware infrastructure 32, and service oriented architecture infrastructure 34.

Information conversion system 26 receives information from communication devices 16 and encapsulates the received information in a common communication protocol, such as an XML protocol. Information conversion system 26 also extracts the encapsulated information from messages or multimedia content for use by communication devices 16 using their native protocol. Examples of information encapsulated by information conversion system 26 may include Internet Protocol (IP) data packets, data transported over computer bus protocols, data transported over sensor specific protocols, high definition television (HDTV) information, analog voice data, and/or digital voice data.

Encapsulated packets 40 from information conversion system 26 may be stored in mass storage device 28. In one embodiment, mass storage device 28 comprises a federated database. Packets 40 are each associated with a metadata record 42 generated by ontology combining engine 30. Each metadata record 42 includes abbreviated information associated with its packet 40. In one embodiment, metadata records 42 include security information data tags for implementing a multiple independent level of security (MILS). Thus, users of airborne communication network 10 may have restricted access to packets 40 according to their clearance level.

Ontology combining engine 30 organizes packets 40 stored in mass storage device 28 according to a specified ontology that may include one or more categories. In one embodiment, ontology combining engine 30 organizes packets 40 by generating an associated metadata record 42 according to a specified ontological structure. For example, information conversion system 26 may receive information including several characteristics of a particular location associated with a particular target. Ontology combining engine 30 may then generate a metadata record 42 including the characteristics of the location that is organized according to the ontological structure.

In one embodiment, ontology combining engine 30 may filter received information according to the specified ontological structure. For example, information conversion system 26 may receive information associated with a particular location that may be outside the scope of the ontological structure. The information may be removed from mass storage device 28 since it is not needed.

Message oriented middleware infrastructure 32 provides asynchronous communication of messages or multimedia content with other nodes 12 in airborne communication network 10. Message oriented middleware infrastructure 32 incorporates a machine to machine (M2M) transfer mechanism that provides information sharing among the nodes 12 of airborne communication network 10. In one embodiment, message oriented middleware infrastructure 32 includes a Java messaging service (JMS) portion 44 that provides a technique for issuing requests for packets from other nodes 12. In another embodiment, message oriented middleware infrastructure 32 includes a data distribution service (DDS) portion 46 that provides access to encapsulated information using a publish/subscribe model.

Service oriented architecture infrastructure 34 provides a web services portal of packets 40 to other nodes 12 in airborne communication network 10. In one embodiment, service oriented architecture infrastructure 34 performs a discovery operation to discover other potential nodes 12 and/or capabilities that may be associated with each node 12. For example, service oriented architecture infrastructure 34 may perform a discovery operation to determine available communication devices 16 configured on other nodes 12 or on remotely from the Global Information Grid. Once the available communication devices 16 are determined, they may be interrogated to retrieve useful information. Using service oriented architecture infrastructure 34, access to packets 40 may be provided according to specified service level agreements (SLAs), qualities of service (QoS), and/or class of service metrics to provide a specified level of data latency time.

Certain embodiments of airborne communication network 10 incorporating service oriented architecture infrastructure 34 may provide an advantage in that nodes 12 may communicate with one another using a mesh-type architecture. In this architecture, failure of a node 12 or a communication path between any two nodes 12 may not necessarily cause a loss of communication to other member nodes 12. For example, if a communication path is temporarily broken between adjacent nodes 12, service oriented architecture infrastructure 34 may re-route communication through other nodes 12 in the airborne communication network 10.

Modifications, additions, or omissions may be made to airborne communication system 10 without departing from the scope of the disclosure. The components of airborne communication system 10 may be integrated or separated. For example, information conversion system 26, ontology combining engine 30, message oriented middleware infrastructure 32, and/or service oriented architecture infrastructure 34 may be executed on the same computing system or may be executed on differing computing systems and communicate with one another through a network. Moreover, the operations of airborne communication system 10 may be performed by more, fewer, or other components. For example, a database system may be implemented on each node 12 to facilitate organization of packets 40 and their associated metadata records 42 in mass storage device 28. Additionally, operations of information conversion system 26, ontology combining engine 30, message oriented middleware infrastructure 32, and/or service oriented architecture (SOA) infrastructure 34 may be performed using any suitable logic comprising software, hardware, and/or other logic. As used in this document, "each" refers to each member of a set or each member of a subset of a set.

Figure 3:
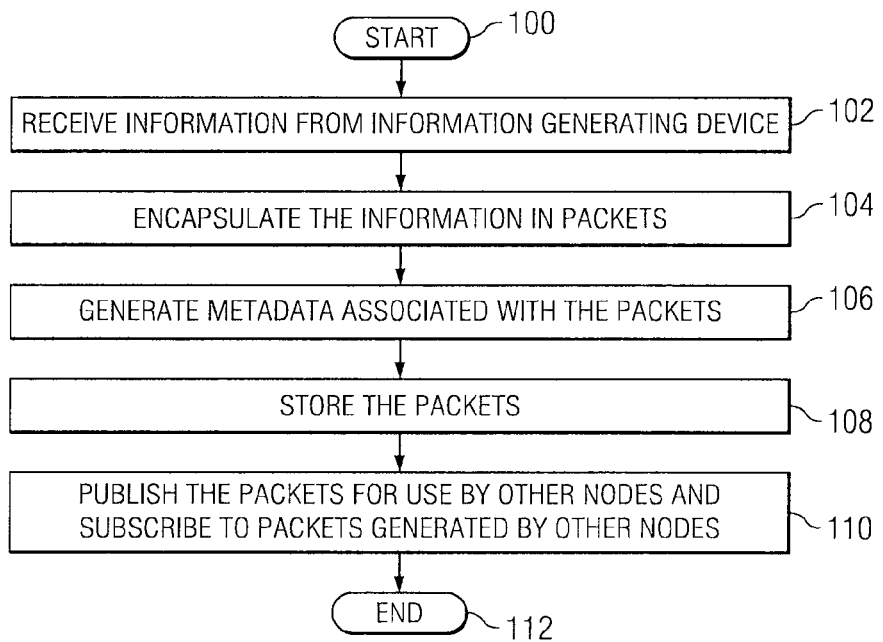
FIG. 3 is a flowchart showing a series of actions that may be performed by each node of the airborne communication network of FIG. 1.

FIG. 3 is a flowchart showing a series of actions that may be performed by each node 12 of the airborne communication network 10 of FIG. 1. In act 100, the process is initiated.

In act 102, node 12 receives information from a communication device 16. Communication device 16 may be configured onboard its associated aircraft 14 or may be remotely configured on a device, such as such as a satellite 20 or a ground-based station 22. In one embodiment, information is received from the Global Information Grid.

In act 104, the received information is encapsulated in one or more packets 40 having a common communication protocol that is readable by other nodes 12 configured in the airborne communication network 10. In one embodiment, information is encapsulated without extracting the information from its existing native protocol. In this manner, access latency may be reduced by preserving the existing native protocol of the information. In one embodiment, the information may be encapsulated in an XML data stream and transmitted over the network using an IPv6 protocol. In another embodiment, streaming information may be encapsulated into multimedia content packets, such as voice over Internet protocol (VOIP), a motion picture experts group (MPEG) protocol, or a digital video broadcasting (DVB) protocol.

In act 106, ontology combining engine 30 may generate metadata according to the received information and store it as a metadata record 42 in mass storage device 28. Node 12 may categorize metadata record 42 according to a specified ontological structure. Using this ontological structure, messages may be associated with other messages having similar characteristics. In one embodiment, ontology combining engine 30 may filter received information that is not categorized according to any category available in the ontological structure such that only information within the scope of ontological structure is maintained in mass storage device 28.

In act 108, packets 40 and their associated metadata records 42 are stored in mass storage device 28. In one embodiment, mass storage devices 28 configured in each of the nodes 12 of airborne communication network 10 comprise a federated database in which a portion of information is stored in each and made available to other nodes 12.

In act 110, service oriented architecture infrastructure 34 publishes the message for use by other nodes 12 in airborne communication network 10 and subscribes to packets stored in other nodes 12. Metadata records 42 form a catalog that may be discovered by service oriented architecture infrastructure 34. For example, a subscribing node 12 may register to receive packets 40 having a particular characteristic identified in the ontological structure. Thus, when a packet 40 including that particular characteristic is stored in mass storage device 28, service oriented architecture infrastructure 34 may automatically transmit the packet 40 and/or its associated metadata record 42 to the subscribing node 12 for its use.

In one embodiment, a request may be issued using a Java messaging service portion 44 from one node 12 and a response to the request may be performed using data distribution service portion 46 of message oriented middleware infrastructure 32. The Java messaging service portion 44 provides efficient handling of autonomous requests while the data distribution service portion 46 provides controlled latency of the response. Thus, the combination of the Java messaging service portion 44 and the data distribution service portion 46 may provide sufficient quality of service and class of service parameters for use with time critical procedures, such as targeting maneuvers that may rely on timely access to information in packet 40.

Modifications, additions, or omissions may be made to the process described above without departing from the scope of the disclosure. The method may include more, fewer, or other acts. For example, service oriented architecture infrastructure 34 may include a mechanism for translating information such as geographical coordinates to those used by aircraft 14. That is, received information may include coordinates of a particular target specified according to a world geodetic system 1984 (WGS84) datum. The various systems of the aircraft, however, may be configured to use coordinates specified according to a North American Datum 1983 (NAD83) datum. When accessed, service oriented architecture infrastructure 34 may implement a web service that automatically translates the coordinate system of the information from the WGS84 datum to the NAD83 datum for use by the various systems of the aircraft 14.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
a node configured on an aircraft that communicates using a native communication protocol, the node comprising:
  a memory comprising:
    an information conversion system configured to:
      receive information formatted according to the native communication protocol from a communication device;
      encapsulate the information in one or more packets according to a common communication protocol that is readable by one or more other nodes configured on one or more other aircraft;
      store the one or more packets in a mass storage device that is coupled to the node;
    the mass storage device coupled to the information conversion system and comprises a metadata record associated with the one or more packets;
    a message oriented middleware infrastructure coupled to the information conversion system and configured to:
      publish the one or more packets for receipt by a node of the one or more other nodes;
      subscribe to one or more other packets stored at a node of the one or more other nodes;
      asynchronously communicate the one or more packets to a node of the one or more other nodes;
    an ontology combining engine coupled to the information conversion system and configured to:
      generate metadata associated with the received information; and
      store the metadata in the mass storage device;
    a service oriented architecture (SOA) infrastructure coupled to the information conversion system and configured to:
      discover information stored in the one or more packets according to its associated metadata record in the mass storage device; and
      automatically transmit the discovered one or more packets for receipt by a node of the one or more other nodes,
  wherein the message oriented middleware infrastructure comprises a Java messaging system (JMS) portion and a data distribution service (DDS) portion in combination provide quality of service and class of service parameters for use with time critical procedures,
wherein the JMS provides handling of autonomous requests and the DDS provides controlled latency of response to the request.

2. The apparatus of claim 1, the message oriented middleware infrastructure configured to:
receive a request, using the Java messaging system portion, from a node of the one or more other nodes for the one or more packets; and
transmit in response to the request, using the data distribution service portion, the one or more packets to the node of the one or more other nodes.

3. The apparatus of claim 1, the mass storage device comprises a metadata record associated with the one or more packet.

4. The apparatus of claim 1, the common communication protocol comprising an extensible markup language (XML) protocol over an Internet protocol network.

5. The apparatus of claim 1, the information conversion system configured to encapsulate the received information without extracting the information from its native communication protocol.

6. The apparatus of claim 1, the information conversion system configured to receive the one or more packets formatted according to the native communication protocol from a satellite or a ground based station.

7. The apparatus of claim 1, the received information is selected from the group consisting of Internet Protocol (IP) data packets, data transported over computer bus protocols, data transported over sensor specific protocols, high definition television (HDTV) information, analog voice data, and digital voice data.

8. The apparatus of claim 1, the packets comprising one or more messages or multimedia content.

9. A method comprising:
receiving, at an information conversion system disposed on an aircraft, information formatted according to a native communication protocol from a communication device;
encapsulating, by the information conversion system, the information in one or more packets formatted according to a common communication protocol that is readable by one or more other nodes configured on one or more other aircraft;
storing the one or more packets in a mass storage device coupled to the information conversion system;
publishing, by a message oriented middleware infrastructure coupled to the information conversion system, the one or more packets for receipt by a node of the one or more other nodes;
subscribing, by the message oriented middleware, to one or more other packets stored at a node of the one or more other nodes;
generating, by an ontology combining engine coupled to the information conversion system, metadata associated with the received information;
storing, by an ontology combining engine coupled to the information conversion system, the metadata in the mass storage device;
discover information stored in the one or more packets according to its associated metadata in the mass storage device; and
automatically transmit the discovered one or more packets for receipt by a node of the one or more other nodes; and providing quality of service and class of service parameters for use with time critical procedures using a Java messaging system (JMS) portion and a data distribution service (DDS) portion.

10. The method of claim 9, further comprising:
receiving a request, using a Java messaging system portion of the message oriented middleware infrastructure, from a node of the one or more other nodes for the one or more packets; and
transmitting, using a data distribution service portion of the message oriented, middleware infrastructure, the one or more packets to the node of the one or more other nodes.

11. The method of claim 9, further comprising:
publishing, using a service oriented architecture infrastructure, the one or more packets for receipt by the node of the one or more other nodes; and
subscribing to other packets stored in the mass storage device of the node of the one or more other nodes.

12. The method of claim 9, further comprising:
discovering, using a service oriented architecture infrastructure, information stored in the one or more packets according to its associated metadata record in the mass storage device; and
publishing the discovered one or more packets for receipt by a node of the one or more other nodes.

13. The method of claim 9, wherein the common communication protocol comprises an extensible markup language (XML) protocol over an Internet Protocol network.

14. The method of claim 9, wherein encapsulating the one or more packets further comprises encapsulating the received information without extracting the information from its native communication protocol.

15. The method of claim 9, further comprising receiving the one or more packets having the native communication protocol from a satellite or a ground based station.

16. The method of claim 9, wherein the received information is selected from the group consisting of Internet Protocol (IP) data packets, data transported over computer bus protocols, data transported over sensor specific protocols, high definition television (HDTV) information, analog voice data, and digital voice data.

17. The method of claim 9, wherein the one or more packets comprise one or more messages or multi media content.

18. Code implemented on a non-transitory computer-readable medium, when executed by a processor, configured to perform at least the following:
receive, at an information conversion system disposed on an aircraft, information: formatted according to a native communication protocol from a communication device;
encapsulate, by the information conversion system, the information in one or more packets formatted according to a common communication protocol that is readable by one or more other nodes configured on one or more other aircraft;
store the one or more packets in a mass storage device coupled to the information conversion system;
publish, by a message oriented middleware infrastructure coupled to the information conversion system, the one or more packets for receipt by a node of the one or more other nodes;
subscribe, by the message oriented middleware, to one or more other packets stored at a node of the one or more other nodes;
generate, by an ontology combining engine coupled to the information conversion system, metadata associated with the received information;

store, by an ontology combining engine coupled to the information conversion system, the metadata in the mass storage device;

discover information stored in the one or more packets according to its associated metadata in the mass storage device; and automatically transmit the discovered one or more packets for receipt by a node of the one or more other nodes; and providing quality of service and class of service parameters for use with time critical procedures using a Java messaging system (JMS) portion and a data distribution service (DDS) portion.

* * * * *